United States Patent Office 2,991,501
Patented July 11, 1961

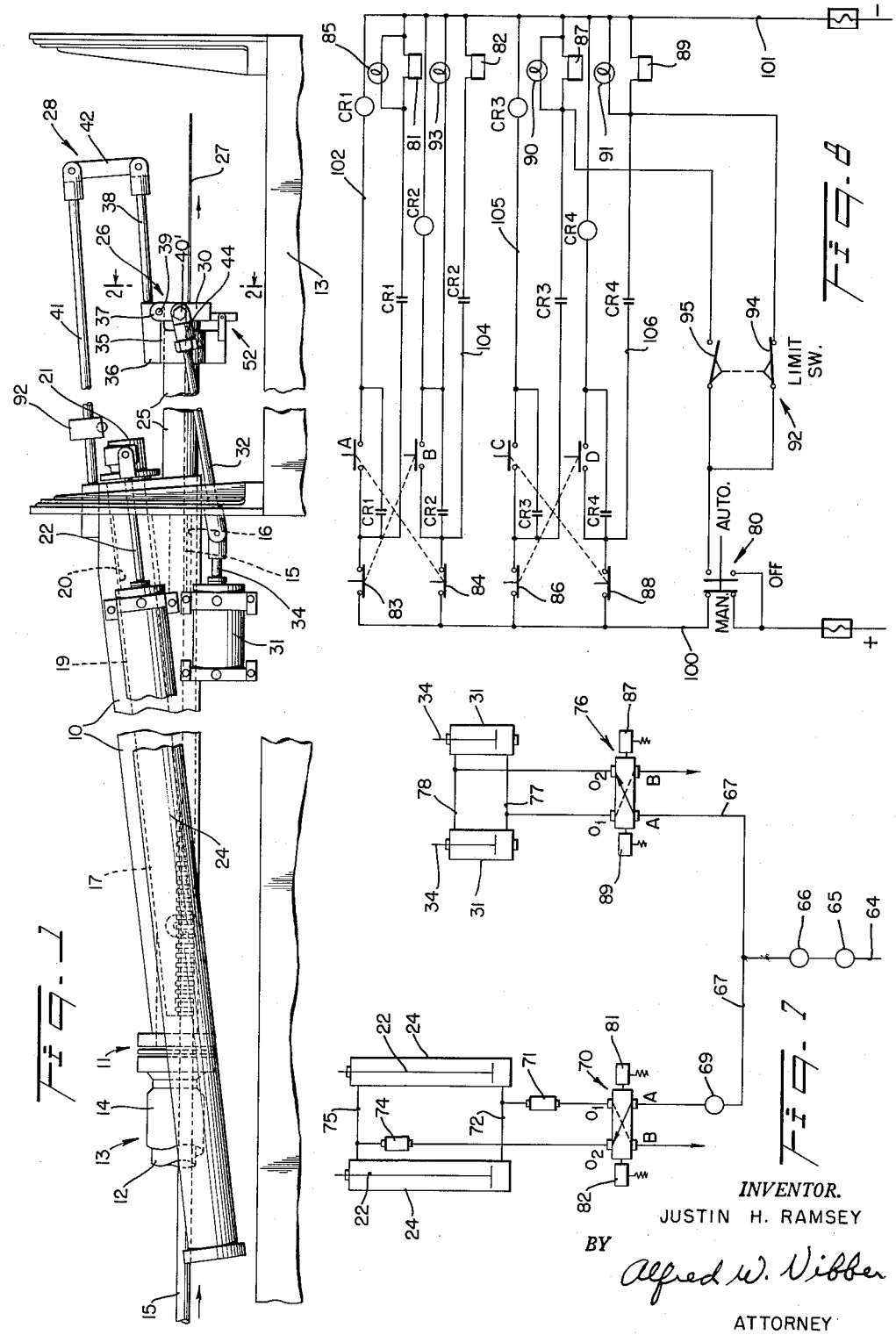

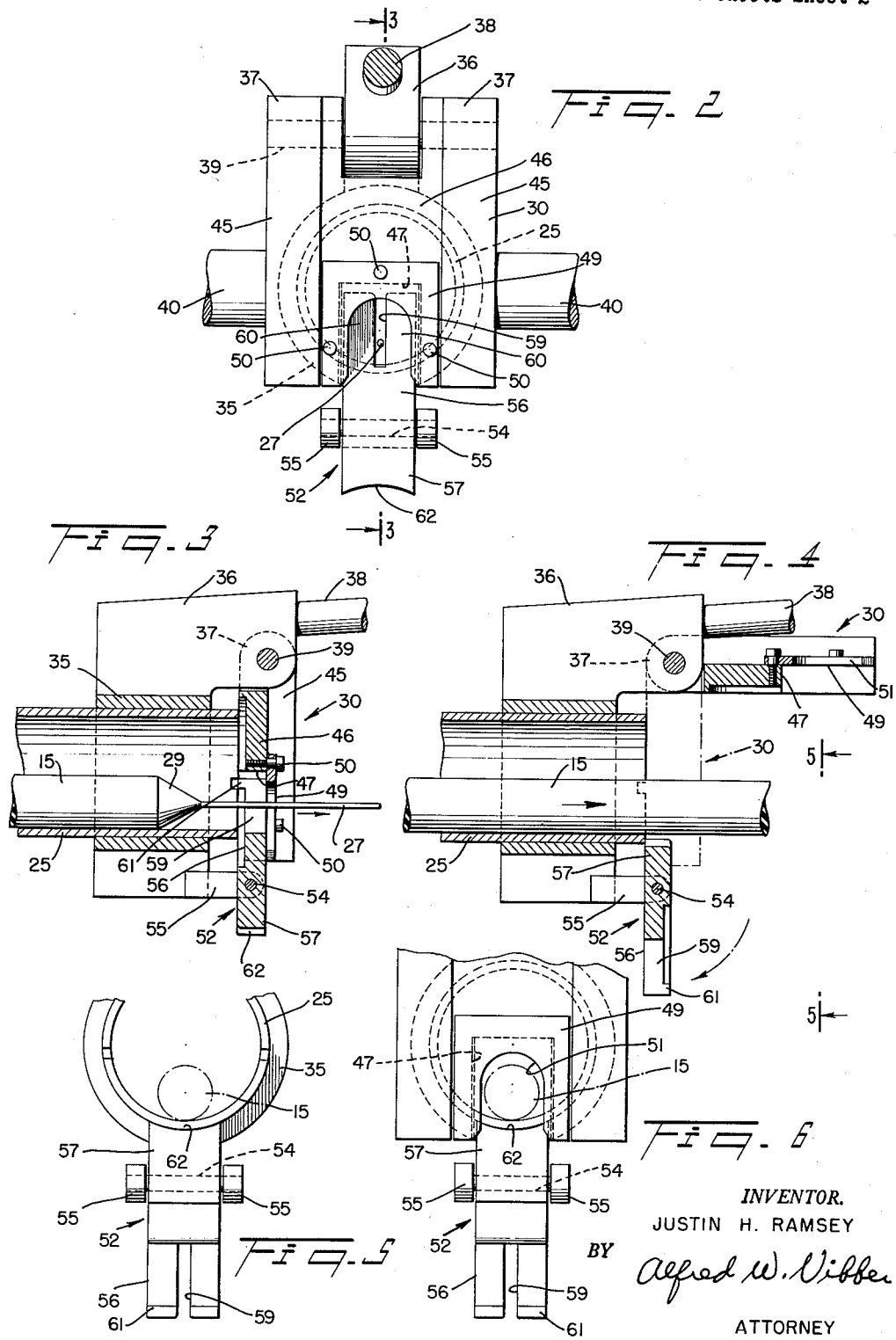

2,991,501
VULCANIZING CHAMBER SEAL
Justin H. Ramsey, R.F.D. 1, Ramsey, N.J.
Filed June 10, 1959, Ser. No. 819,351
14 Claims. (Cl. 18—6)

This invention relates to an improved seal for a chamber containing fluid held at high pressure, the seal being of such construction as to allow the passage of an elongated member therethrough while maintaining the fluid in the chamber under pressure. The seal of the invention is particularly useful with a chamber containing water held at high pressure, such as in a continuous vulcanizing apparatus; in certain of its aspects the invention particularly relates to the combination of a main seal and an auxiliary seal whereby substantial sealing is maintained at all times during operation of the apparatus between, on the one hand, the material being vulcanized and/or a pull-through leader attached to the material, and, on the other hand, at least one of the main and auxiliary seals.

This application is related to prior application Serial No. 805,956, of Ramsey and Van Riper, filed April 13, 1959, and now abandoned.

Among the objects of the present invention is the provision of a novel auxiliary sealing means which selectively cooperates with the pull-through leader and the larger diametered material being vulcanized.

Another object of the invention resides in the provision of an auxiliary seal of the type described which may be initially set to cooperate with the pull-through leader, and which, after the leader has passed the auxiliary seal, is automatically set so as to cooperate, when necessary, with the material being vulcanized.

Still a further object of the invention resides in the provision of a novel combination of main and auxiliary sealing means, the main sealing means being movable in the direction of travel of the material being vulcanized when such material exerts an undue longitudinally directed force upon the main sealing means, thereby at least partially to retract the main sealing means from the material being vulcanized; such motion of the main seal automatically energizes the auxiliary sealing means so that it then closes to form a substantial seal with the material being vulcanized, thereby preventing the undue loss of pressure within the vulcanizing chamber.

Still another object of the invention lies in the provision of a novel, simple and easily operated controlling system for the main and auxiliary sealing means, whereby the operator is aware at all times of the positions of the two sealing means.

The above and further objects and novel features of the present invention will be more fully apparent from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a fragmentary view in side elevation of the portion of the vulcanizing apparatus at the exit end thereof, the parts of the apparatus being shown in the position thereof, corresponding to the fully inserted, operative position of the main seal and the closed position of the auxiliary seal wherein it sealingly cooperates with the pull-through leader, as during the initial threading or stringing-up of the apparatus;

FIG. 2 is a view in transverse vertical section through the apparatus of FIG. 1, the section being taken along the line 2—2 of FIG. 1, the figure showing the auxiliary sealing means in closed position sealingly cooperating with the pull-through leader;

FIG. 3 is a view in longitudinal vertical section through the auxiliary sealing means, the section being taken along the line 3—3 of FIG. 2, the junction between the material being vulcanized and the pull-through leader being shown approaching the auxiliary seal;

FIG. 4 is a view in longitudinal vertical section through the auxiliary sealing means, the figure being generally similar to FIG. 3 but showing the auxiliary sealing means in open position and the main body of the material being vulcanized, such as a cable, passing therethrough;

FIG. 5 is a fragmentary view in end elevation of the auxiliary sealing means in the position shown in FIG. 4, the view being taken in the direction from right to left from the point of view of line 5—5 of FIG. 4;

FIG. 6 is a view in end elevation of the auxiliary sealing means of FIGS. 2 to 5, inclusive, the parts of the sealing means being shown in position to cooperate sealingly with the cable being vulcanized;

FIG. 7 is a schematic view of the apparatus controlling the main and auxiliary sealing means and of the compressed air circuits connecting the control elements thereof; and FIG. 8 is a wiring diagram of the control and indicating circuits for the apparatus of FIG. 7.

The main sealing means shown herein is of the type disclosed and claimed in Ramsey and Van Riper application Serial No. 805,956, filed April 13, 1959. Such device has a main, seal forming casing 10 which is joined at 11 to the exit end of the cooling zone 13 of a continuous vulcanizing apparatus. Such cooling zone has an inner tubular chamber 12 and an outer cooling jacket 14, as shown. The elongated material being vulcanized, such as a cable or the like shown at 15, travels longitudinally through tube 12 and into and through a horizontal passage 16 disposed in casing means 10 in alignment with the passage through tube 12. As disclosed in application Serial No. 805,956, and as schematically shown herein a main seal 17 is positioned within casing 10 somewhat to the left of the intersection of the horizontal passage 16 therein and of an inclined passage 20 in casing 10. The sealing means 17 is in the form of an angularly disposed slotted extension on a rod 19 which is reciprocable centrally of inclined passage 20 within casing 10. Rod 19 is connected centrally to a cross head 21; the outer ends of piston rods 22 of elongated cylinders 24 are connected to the ends of such cross head, whereby sealing means 17 may be selectively advanced or retracted, as desired.

As disclosed in application Serial No. 805,956, sealing means 17 may be selectively retracted into inclined passage 20 to remove it completely from horizontal passage 16. Also, when it is desired to clean sealing means 17 or to substitute another sealing means therefor, the complete extension of piston rods 22, after having released safety latch 28, extending between a lower rod 38 and an upper rod 41, allows the sealing means to be completely withdrawn from casing 10. As is also disclosed in application Serial No. 805,956, the main sealing means is momentarily yieldable in the direction of travel of the material being vulcanized when an enlargement or the like on the material engages the sealing means 17 and overcomes the thrust imposed thereon by cylinders 24. Such action allows the vulcanizable material to proceed without being unduly damaged by the main sealing means, but the temporary unseating of the main sealing means by such retraction thereto produces an undue amount of leakage of water therepast. The present invention is designed to overcome such difficulty.

To the exit end of casing 10 in alignment with the horizontal passage 16 therein there is secured an extension tube 25. An auxiliary sealing means 26 is attached to the outer free end of tube 25. Means 26 has a main generally annular body 35 generally in the form of a split ring which is telescoped over the end of tube of 25 and is clamped thereto. A clapper or vane member 30 is pivoted upon body 35 by a pair of spaced ears 37 thereon, a central projection 36 on body 35 received between ears 37, and a horizontal pivot pin 39 passing through ears 37 and projection 36. Clapper member 30 is selectively held in either its vertical position, shown in FIGS. 1, 2, and 3, or its elevated horizontal position, shown in FIG. 4, by means of two relatively short fluid operated motors 31. Motors 31, which as shown in FIG. 7 are connected in parallel, are positioned on the respective sides of casing 10 and have their piston rods 34 connected through adjustable links 32 to terminal fittings 44. Fittings 44, in turn, are pivotally connected to horizontal, oppositely directed trunnion members 40 on clapper 30. It will be apparent that, when the motors 31 are operated to thrust their piston rods 34 to the right, the clapper member 30 will be elevated into its inoperative, horizontal position, and that when the piston rods of motors 31 are thrust to the left, the clapper member 30 will be pulled downwardly into its vertical, operative position.

The clapper member 30 of the auxiliary sealing means has two relatively thick portions 45 extending along opposite (vertical) edges thereof. The central portion 46 of plate 30, between side portions 45, is of markedly less thickness, as shown in FIG. 3. A central portion of the edge of plate 30 remote from pivot pin 39 is cut away to provide a generally rectangular passage 47 therethrough. Passage 47 lies symmetrically as regards the vertically axial plane through tube 25, and is of a size and shape somewhat greater than the cross section of the material to be vulcanized by the apparatus. This relationship of the parts is best shown in FIG. 6. Plate 30 is provided with a removable retainer or insert plate 49 which is secured to plate 30 by studs 50. Insert plate 49 has a generally inverted U-shaped slot 51 centrally therethrough, slot 51 somewhat more closely fitting the material such as cable 15 passing through the auxiliary seal than does passage 47.

The auxiliary seal is provided at the bottom thereof with a small pivotally mounted sealing vane 52 which allows the auxiliary sealing means to function initially to form a seal with the pull-through leader (FIGS. 2 and 3) and later, when necessary, to function to form a seal with material 15 (FIGS. 4, 5, and 6). Sealing vane 52 is mounted between spaced horizontal ears 55 on body 35 and is pivotally connected thereto by a horizontal pivot pin 54. Vane 52 is in the form of a first-class lever having a short arm 57 and a long arm 56. Arm 56 has a central slot 59 therein of sufficient width freely to pass the pull-through leader therethrough. Slot 59 is of such extent that its root lies flush with or somewhat below the inner surface of tube 25. The other arm 57 of vane 52 is unslotted, and has a terminal edge portion 62 which is generally of the same curvature as the outer surface of tube 25. Arm 57 is of such length that the vane 52 may pivot freely in either direction between the position shown in FIG. 3 and that shown in FIG. 4. As is evident in FIGS. 3 and 6, the upper end of arm 57 of vane 52, including surface 62, cooperate with clapper member 30, when the latter is closed, and material 15 to prevent the very rapid escape of water through the auxiliary seal.

In stringing up the continuous vulcanizing apparatus, the pull-through leader is snaked through the vulcanizing zone, the cooling zone, the horizontal passage 16 in casing 10, and finally through extension tube 25. Preferably this is done with the main seal 17 at least partially retracted. The vane 52 is then swung into the position shown in FIGS. 2 and 3, with the pull-through leader extending through slot 59, and the motors 31 are then operated to swing vane 30 downwardly into its vertical operative position. Thereupon the main seal 17 is advanced into its operative position, cooling water is supplied to the main seal 17 through one or more ports, through the wall of casing 10, vulcanizing steam is introduced into the vulcanizing zone of the apparatus, and take-up mechanism, not shown, begins to pull the pull-through leader and the material 15 attached thereto through the vulcanizing apparatus.

The auxiliary seal remains in the position shown in FIG. 3 until the generally conical joint 29 between the pull-through leader 27 and cable 15 approaches the auxiliary seal. This will be apparent to the operator from a marking on the pull-through leader adjacent the joint 29. When joint 29 has reached such position, the operator will operate the control circuit, to be described, so as to open vane 30, whereby to allow joint 29 to pass therethrough and to allow material 15 to continue to pass therethrough.

Upon the unseating of the main seal 17, as described above, leakage of water and possible steam from the open end of tube 25 may very probably occur at an excessive rate. To overcome this difficulty, the auxiliary sealing means, controlled by means which is responsive to the unseating of the main sealing means, lowers the vane 30 into the position shown in FIG. 6 so that the slotted retainer plate 49 therein overlies and cooperates with the outer end of tube 25 and the upper end of arm 57 on vane 52. The resulting interfitting parts fairly closely engage the cable 15, and thus form an effective seal therewith. The apparatus is further provided with means which, when the main seal 17 is returned to its fully operative position, automatically retracts vane 30, with its attached plate 49, of the auxiliary sealing means into its raised, inoperative position, shown in FIG. 4. The manner of operation of the device and the character of the control system therefor will more particularly appear upon consideration of FIGS. 7 and 8.

As shown in FIG. 7, the main power cylinders 24 for retaining seal 17 in operative position are under the control of a solenoid operated reversing valve 70, and the cylinders 34 for controlling the auxiliary seal 26 are under the control of the solenoid operated reversing valve 76. Air under pressure from a suitable source (not shown), is led through a main air pipe 64 through a suitable filter 65 and a lubricating fixture 66 to a common supply pipe 67 for the valves 70 and 76. Inlet port A of valve 70 is fed through an adjustable pressure reducing valve 69. One outlet port $O_1$ of valve 70 is connected through a suitable throttling valve 71 to a common pipe 72 connecting the rear ends of cylinders 24. The other outlet port, $O_2$, of valve 70 is connected through a throttling valve 74 to a common pipe 75 connecting the forward ends of cylinders 24. The fourth port B of valve 70 leads to the atmosphere, as shown. The structure of valve 70 is such that when the inner movable valve element thereof (not shown) is thrust to the right, pipes 67 and 75 are connected, that when such element is thrust to the left, pipes 67 and 72 are connected, and that pipes 72 and 75 are alternately connected to the atmosphere, as required, through port B.

Valve 76 is of generally the same construction as valve 70, and functions in the same manner. When the inner valve element of valve 76 is thrust to the right, pipe 67 is connected through ports A and $O_2$ to pipe 78, connected to the forward ends of cylinders 31, whereby to pull the auxiliary sealing means 26 into the operative position thereof shown in FIG. 1. When the movable element of valve 76 is thrust to the left, pipe 67 is connected by way of ports A and $O_1$ to the pipe 77 connecting the rear ends of cylinders 31, whereby to thrust the auxiliary sealing means into the inoperative position thereof shown in FIG. 4.

The solenoids which control the valves 70 and 76 are connected in the control circuit shown in FIG. 8; such circuit selectively permits the manual control of each of the main and auxiliary sealing means, and also permits the automatic control of the auxiliary sealing means whereby to move it into operative sealing position with respect to the material being vulcanized upon the substantial unseating of the main sealing means during steady operating conditions of the apparatus.

As shown in FIG. 8, the control circuit is supplied with current from two main wires, 100 and 101. Interposed in line 100 is a switch 80 having a movable switch element which, when in the left hand position, places the circuit in condition for manual control, and when in its right hand position, places the circuit in its "automatic" position, to be explained. In the intermediate position of the movable switch element switch 80 is open or "off."

Interposed between the main lines 100 and 101 are four sub-circuits, which are connected, respectively, to line 100 through the normally closed spring biased switches 83, 84, 86, and 88. The first sub-circuit, 102, includes a normally open spring biased switch A, a holding circuit relay CR1 energized by switch A and having contacts similarly designated CR1 which are closed when the relay is energized and are open when the relay is de-energized. Circuit 102 includes the solenoid coil 81 for valve 70 and a signal light 85, which is preferably green, connected in parallel with solenoid 81.

Circuit 104, which selectively energizes solenoid coil 82 of valve 70, is generally similar to circuit 102. Circuit 104 includes a normally open spring biased switch B, which when momentarily closed energizes holding circuit relay CR2 and closes the corresponding relay contacts CR2. When such contacts are closed, solenoid coil 82 is energized and (red) signal lamp 93 is lighted. Since the third and fourth circuits 105 and 106 are substantially the same as circuits 102 and 104, they need not be described in detail. The description of the complete circuit during a typical starting and steady running operation of the vulcanizing apparatus will suffice.

It will be assumed that the pull-through leader 27 has been strung through the apparatus, that is, through the vulcanizing zone, the cooling zone, the zone of the main seal, and the zone of the auxiliary seal. It will be assumed that the auxiliary seal is closed, and that the extruding mechanism has begun to extrude a sheath onto the cable 15. It will also be assumed that the cooling zone contains a substantial amount of cooling water, and that the vulcanizing zone is subjected to vulcanizing steam. With switch 80 in its manual position, the operator will momentarily close switch A to close relay CR1, to energize the solenoid 81, and thus to thrust the main seal 17 into its operative position. The operator will also have momentarily pressed button C to energize circuit 105 by energizing relay CR3, and thus energizing solenoid 87. Auxiliary seal 26 will thus be thrust into the operative position thereof shown in FIGS. 1, 2, and 3. It is to be understood that the lower vane 52 has been placed in the position shown in FIG. 2 before the clapper 30 of the auxiliary seal 26 had been lowered to the position of FIG. 2. With the auxiliary seal 26 in such operative position, the second indicating (green) light 90 will be illuminated.

The pull-through leader 27 is provided with appropriate indicating or marking means, whereby the operator will be warned when the junction 29, between the pull-through leader and cable 15, approaches the auxiliary seal. When the cable has reached the position shown in FIG. 3, it will have established a sealing relationship with the main seal 17 so that the auxiliary seal need no longer be in operative position to maintain sealing pressure within the vulcanizing apparatus. Accordingly, the operator now moves the auxiliary sealing means into its inoperative position, shown in FIGS. 4 and 5. He does this by momentarily depressing switch D, thus energizing circuit 106. At the same time, by reason of the cross mechanical connection between switch D and switch 86, indicated in dotted lines, switch 86 is momentarily opened, thereby de-energizing circuit 105. The energization of solenoid 89 and the de-energization of solenoid 87 causes valve 76 to shift to raise the auxiliary seal 26 into its inoperative position. At the same time, the (red) warning light 91 is illuminated.

The circuit of FIG. 8 may now be placed in automatic position by moving the element of switch 80 to its right hand position. This disconnects wire 100 from its source of current, and connects such source through a two-pole limit switch 92 to the control circuits 105 and 106. Limit switch 92, which is normally in the position shown in FIG. 8, connects the source of current to the solenoid 89 thereby to maintain the auxiliary seal in its elevated, inoperative position. Limit switch 92 may, for example, be mounted on rod 41 in position to cooperate with cross-head 21. When the cross-head is thrust to the right, as by the unseating of the main seal 17, switch element 94 of the limit switch is raised, thereby to break the circuit supplying solenoid 89, and switch element 95 of the limit switch completes the circuit between the current source and solenoid 87. At this time, the lower pivotally mounted sealing vane 52 will be in the position shown in FIGS. 4, 5, and 6. Upon the energizing of solenoid 87, member 30 of the auxiliary seal will be lowered, into the position of FIG. 6, over the cable 15 passing through the zone of the auxiliary seal. Plate 49 of the seal 26 overlies the upper edges of arm 57 of vane 52, and the opening or slot 51 in plate 49 fits fairly closely about the cable 15. Thus, while the main seal 17 is momentarily unseated, the thus energized auxiliary seal takes over its function and maintains effective vulcanizing and cooling fluid pressure within the vulcanizing chamber.

Although only a single embodiment of the invention has been illustrated in the drawings by way of example, it is to be expressly understood that various changes, such as in the relative dimensions of the parts, the materials used and the like, may be made therein without departing from the spirit and scope of the invention as will now be apparent to those skilled in the art.

What is claimed is:

1. Apparatus for continuously vulcanizing elongated vulcanizable material, comprising an elongated chamber through which the material passes, means to supply the interior of the chamber with heated fluid under pressure, a main seal within the chamber through which the material passes in its travel through the chamber, the main seal sealingly cooperating with the material and being selectively movable into and away from sealing relationship with the material, a normally open movable auxiliary seal which when closed sealingly cooperates with the material, and means responsive to movement of the main seal from sealing relationship with the material for closing the auxiliary seal.

2. Apparatus for continuously vulcanizing elongated vulcanizable material, comprising an elongated chamber through which the material passes, means to supply the interior of the chamber with heated fluid under pressure, a main seal within the chamber through which the material passes in its travel through the chamber, the main seal sealingly cooperating with the material and being selectively movable into and away from sealing relationship with the material, means for yieldingly thrusting the main seal into its operative position in which it has sealing relationship with the material, a normally open movable auxiliary seal which when closed sealingly cooperates with the material, and means responsive to movement of the main seal from its operative position in sealing relationship with the material for closing the auxiliary seal.

3. An apparatus as defined in claim 2, wherein the main seal is movable in a direction generally along the path of travel of the material but at a small acute angle with respect thereto, the main seal is thrust into operative position counter to the direction of travel of the material, and the means for yieldingly thrusting the main seal exerts a force on the main seal which is overcome by engagement of an enlargement on the material with the main seal.

4. An apparatus as defined in claim 3, wherein the means for thrusting the main seal into operative position comprises an expansible chamber reciprocable air-operated motor.

5. An apparatus as defined in claim 4, wherein the means for closing the auxiliary seal comprises a prime mover, and control means therefor, said control means including a control device positioned to cooperate with a member which is connected to and movable with the main seal as the latter moves from its operative position.

6. In an apparatus for treating elongated material with fluid under pressure, the combination of a conduit through which elongated material travels, said elongated material having at least two elongated zones of different diameter throughout its length, and a unitary sealing means for sealingly cooperating with each of the zones of different diameter of the elongated material, whereby to establish a seal between the material and the conduit as such respective zones travel past the sealing means, the sealing means comprising vane means selectively interposable into the path of travel of the material, the vane means comprising a first vane having an opening therethrough receiving the zone of the largest diameter of the material, and a second vane adapted selectively to overlie the opening in the first vane, or to be removed from juxtaposition therewith, said second vane having an opening therethrough of such size as sealingly to cooperate with a zone of smaller diameter of the material.

7. Apparatus as defined in claim 6, wherein the sealing means is positioned at an end of the conduit, and each of said vanes is pivoted at one side of the conduit for selective movement into an operative position, in which the vane overlies the end of the conduit, and into an operative position, in which the vane lies laterally removed from the path of travel of the material through the said end of the conduit.

8. Apparatus as defined in claim 7, wherein the second vane has a relatively narrow slot extending inwardly from its free edge, and wherein the first vane has a relatively wide slot extending inwardly from its free edge, the two slots being superimposed when the two vanes are in operative position.

9. Apparatus as defined in claim 8, wherein the second vane forms a first, longer arm of a first-class lever, the second arm of the lever being shorter than the first arm, and having an imperforate outer end having its edges adapted selectively to lie inwardly beneath the edges of the first vane when the sealing means sealingly cooperates with a zone of larger diameter of the material.

10. An apparatus as defined by claim 6, wherein the main seal is retractable from its operative position, including means for thrusting the main seal into its operative position, and control means responsive to movement of the main seal from its operative position, after the auxiliary seal has once been opened, to close the auxiliary seal so as sealingly to cooperate with the elongated material being vulcanized.

11. Apparatus as defined in claim 9, wherein the first vane is mounted for oscillation on a horizontal pivot pin mounted above the end of the conduit, and the second vane is mounted for oscillation about a horizontal pivot pin mounted beneath said end of the conduit, the outer end of the second arm of the second vane being upwardly concave when said second arm lies upwardly, the length of said second arm of the second vane being such and the pivot for the second vane being so located that the second arm of the second vane may rotate freely past said end of the conduit.

12. In an apparatus for treating elongated material with fluid under pressure, the combination of a conduit through which elongated material travels, said elongated material having at least two elongated zones of different diameter throughout its length, and a unitary sealing means for sealingly cooperating with each of the zones of different diameter of the elongated material, whereby to establish a seal between the material and the conduit as such respective zones travel past the sealing means, the sealing means comprising vane means selectively interposable into the path of travel of the material, the vane means comprising a first vane having an opening therethrough receiving the zone of the largest diameter of the material, and a second vane adapted selectively to lie in alignment with and close to the opening in the first vane, or to be removed from juxtaposition therewith, said second vane having an opening therethrough of such size as sealingly to cooperate with a zone of smaller diameter of the material.

13. An apparatus as defined in claim 6 wherein the second vane lies inwardly of the first vane when the two vanes are in operative, sealing position, and comprising means for selectively moving the first vane into and out of its operative position overlying the second vane.

14. Apparatus as defined in claim 13, comprising means for mounting the second vane means for free movement into and out of operative, sealing position, whereby when the first vane means is removed from its operative position overlying the second vane means the second vane means may be moved into inoperative position by contact therewith of a zone of the largest diametered material.

References Cited in the file of this patent

UNITED STATES PATENTS

| 1,709,949 | Rasmussen et al. | Apr. 23, 1929 |
| 1,910,634 | Pearce | May 23, 1933 |
| 2,124,015 | Stone et al. | July 19, 1938 |
| 2,603,834 | Ramsey | July 22, 1952 |
| 2,883,702 | Van Riper | Apr. 28, 1959 |
| 2,908,035 | De Haan | Oct. 13, 1959 |

FOREIGN PATENTS

| 793,311 | Great Britain | Apr. 16, 1958 |